US006728714B1

(12) United States Patent
Doganata et al.

(10) Patent No.: US 6,728,714 B1
(45) Date of Patent: Apr. 27, 2004

(54) SYSTEM AND METHOD FOR ASSIGNING UNIQUE IDENTIFIER TO DELETED UNOPENED ORIGINAL SENDER E-MAIL AFTER DELIVERY

(75) Inventors: Yurdaer N. Doganata, Chestnut Ridge, NY (US); Jurij R. Paraszczak, Pleasantville, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/452,339

(22) Filed: Nov. 30, 1999

(51) Int. Cl.[7] .............................................. G06K 17/30
(52) U.S. Cl. .................. 707/10; 707/6; 707/9; 709/200; 709/206; 709/219; 709/226; 709/249
(58) Field of Search .................... 707/1–10, 100–106.1, 707/200–205, 500.1, 501.1, 511, 512–513; 709/203–205, 206–209, 240–245, 313, 200, 219, 249, 226; 713/200–202; 379/93.24, 88.11–88.12, 93.01, 93.18, 88.14, 88.19; 715/501.1, 511–513

(56) References Cited

U.S. PATENT DOCUMENTS

| | | | |
|---|---|---|---|
| 5,590,178 A | * 12/1996 | Murakami et al. | 379/93.18 |
| 5,793,972 A | * 8/1998 | Shane | 705/14 |
| 5,826,022 A | * 10/1998 | Nielsen | 709/206 |
| 5,893,099 A | * 4/1999 | Schreiber et al. | 707/10 |
| 5,928,333 A | * 7/1999 | Landfield et al. | 709/245 |
| 5,937,162 A | * 8/1999 | Funk et al. | 709/206 |
| 5,944,786 A | * 8/1999 | Quinn | 379/88.12 |
| 5,961,590 A | * 10/1999 | Mendez et al. | 709/206 |
| 6,026,396 A | * 2/2000 | Hall | 707/104.1 |
| 6,088,720 A | * 7/2000 | Berkowitz et al. | 709/206 |
| 6,092,101 A | * 7/2000 | Birrell et al. | 379/93.24 |
| 6,108,688 A | * 8/2000 | Nielsen | 709/206 |
| 6,216,122 B1 | * 4/2001 | Elson | 345/744 |
| 6,324,569 B1 | * 11/2001 | Ogilvie et al. | 707/500 |
| 6,393,465 B2 | * 5/2002 | Leeds | 709/206 |

FOREIGN PATENT DOCUMENTS

| | | | | |
|---|---|---|---|---|
| EP | 0813162 A2 | * | 12/1997 | 17/60 |
| EP | 0984593 A1 | * | 3/2000 | 12/58 |

OTHER PUBLICATIONS

Russell Borland, running microsoft outlook 97, microsoft press, 1997, part II, chapter 3, pp. 100–101, 106–109.*
Advanced microsoft outlook, computer services, southwest missouri state university, http"//computerservices.smsu.edu, doco54XP, pp. 1–12.*

* cited by examiner

Primary Examiner—Srirama Channavajjala
(74) Attorney, Agent, or Firm—Douglas W. Cameron; Anne V. Dougherty

(57) ABSTRACT

A system and method wherein a sender can create an e-mail or other communication cancellation request which identifies a previously-sent communication, bears the communication type designation of a cancellation request as its "subject" or "reference", and is automatically communicated to all of the same sites to which the previously-sent communication was sent. At the receiving end, a cancellation agent monitors the "subject" of all incoming communications to determine if any are cancellation requests. If a cancellation request is detected at the receiving end, the cancellation agent locates the identified communication and deletes same. Once the communication has been deleted, the cancellation agent replies to the cancellation request by notifying the sender of the location at which the identified communication was found (e.g., inbox folder, trash folder, etc.) and of deletion of the communication. Should the cancellation agent be unable to locate the communication, due to the fact that the recipient has permanently deleted the communication or has downloaded same, the sender is notified of that fact.

28 Claims, 2 Drawing Sheets

SYSTEM AND METHOD FOR ASSIGNING UNIQUE IDENTIFIER TO DELETED UNOPENED ORIGINAL SENDER E-MAIL AFTER DELIVERY

FIELD OF THE INVENTION

This invention relates generally to the field of electronic communications and more particularly to a method for a sender to locate and delete a piece of electronic mail after the mail has been sent.

BACKGROUND OF THE INVENTION

With personal computers having become commonplace, most office communications, and indeed a large percentage of so-called "home communications", are now conducted electronically. The ability for a sender to communicate a message to another at any time of day, and to have a fairly reliable record of delivery of the message, facilitates communications, particularly in a distributed working environment where co-workers may be physically located at geographically remote sites. Communications among individuals located in different countries and/or in different time zones are particularly suitable for electronic delivery, such that a message can be opened by a recipient during the recipient's normal business day, even if the electronic message was sent hours earlier during the sender's business day. In addition, the ease of distributing a single electronic mail message to a plurality of recipients greatly reduces the time spent in providing information to a large group of interested parties.

The sending of electronic mail (hereinafter referred to as "e-mail") must, however, be exercised with care. Once the sender clicks on the "send" button to send an e-mail to one or a group of people, the e-mail message is immediately transmitted to the mailboxes of each of the recipients and is not retrievable. There currently exists no way to "rescind" an e-mail message, although there may be reasons why a sender may wish to delete the e-mail after it has been sent; for example, failure to include a desired attachment; realization that wrong information was included; fear that the content should not have been "written" down in light of privilege doctrine, a determination that the message is obsolete, due to intervening events; etc. In any of those instances, if a message could be deleted before it has been read, time and resources could be saved and possible misunderstandings could be avoided.

It is desirable, therefore, and is an object of the present invention to provide a system and method for rescinding e-mails after they have been sent.

It is another object of the invention to provide a system and method for tracing all copies of e-mails which have been sent, determining their current status, and reporting that status to the sender.

Yet another object of the invention is to provide a method for a sending site to automatically generate and send a cancellation notice to an e-mail receiving site and for that receiving site to automatically locate and delete the e-mail.

SUMMARY OF THE INVENTION

These and other objects are realized by the present invention which provides a system and method wherein a sender can create an e-mail cancellation request which identifies a previously-sent e-mail, bears the designation of a cancellation request as its "subject" or "reference", and is automatically communicated to all of the same sites to which the previously-sent e-mail was transmitted. At the receiving end, a cancellation agent monitors all incoming e-mails to determine if any are cancellation requests. If a cancellation request is detected at the receiving end, the cancellation agent locates the identified e-mail and deletes same. Once the e-mail has been located, or alternatively upon deletion of same, the cancellation agent replies to the cancellation request by notifying the sender of the status of the e-mail, preferably by reporting the location at which the identified e-mail was found (e.g., inbox folder, trash folder, etc.) and the disposition (e.g., deletion) of the e-mail. Should the cancellation agent be unable to locate the e-mail, due to the fact that the recipient has permanently deleted the e-mail or has downloaded the e-mail, the sender is notified of that fact.

BRIEF DESCRIPTION OF THE DRAWINGS

The invention will now be described with reference to the appended drawings wherein.

DESCRIPTION OF THE PREFERRED EMBODIMENT

In accordance with the present invention, a sender of an original piece of electronic mail (hereinafter "e-mail") at a first, sending, location can create a cancellation request which is automatically communicated to a cancellation agent at a second, receiving, location. At the receiving location, the cancellation agent locates and deletes the original e-mail identified in the cancellation request and generates a response to notify the sender of the status of the original e-mail, preferably including the location and disposition of the original e-mail.

In the ensuing description, it is to be understood that the terms "e-mail" and "message" are being used interchangeably and generically. While some electronic mail systems have several categories of electronic communications, including letters, messages, alerts, broadcasts etc., and while a plurality of additional terms of the art may apply (e.g., transmission, communication, etc.), the present invention is meant to apply to all categories of electronic communications sent from one site to another. In addition, the ensuing description is based on the Lotus Notes model for electronic mail systems; however, it is applicable to any mail system with their specific programming interface. Furthermore, it is envisioned that the present invention can be applied across different electronic mail systems, provided that some standardized communication format is used, or provided that the cancellation agent is equipped with translation software which enables it to translate cancellation requests from the sending location's mail format to the receiving location's mail format.

Figure 1:
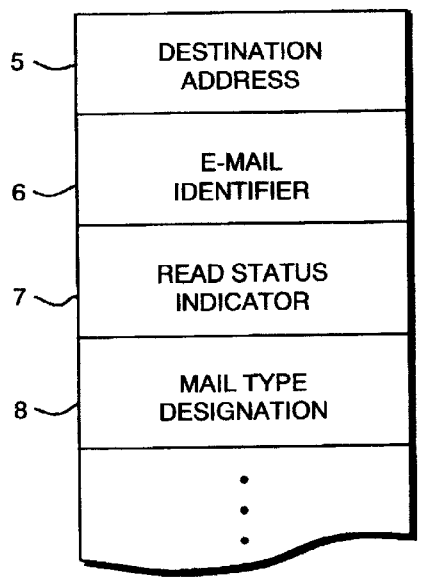
FIG. 1 provides a schematic illustration of a plurality of relevant fields, including a unique e-mail identifier, for an electronic-mail message.

FIG. 1 provides a schematic illustration of relevant fields which are components of every piece of electronic mail generated by a sending location. Each e-mail comprises a plurality of fields (e.g., about fifty fields for a Lotus Notes e-mail message). Each e-mail constitutes a database document and is assigned a unique id, hereinafter referred to as the "e-mail identifier", shown at 6 of FIG. 1. For an e-mail which is sent to a plurality of sites on a distribution list, there is a single e-mail identifier assigned, since it is considered a single document which is being distributed to multiple receiving locations. Such e-mail identifiers have been used in the past to recover documents in the event of a system failure.

In addition to the e-mail identifier field, an e-mail includes a "destination address" field 5, which may include one or a plurality of destination addresses for the single e-mail message. Also included is a "mail type designation" field 8, more commonly referred to as a "subject" field. The mail type designation field is generally provided as a user-input field, but the content for the field may also be automatically input by the mail processing program in certain instances. Field 7 comprises a "read status field", which is generally provided to indicate-whether the e-mail addressee (i.e., the user) has opened the e-mail message. The opening of an e-mail message may not only affect the state of the read status field but also the actual storage location of the e-mail message, as further detailed with reference to FIG. 2.

Figure 2:
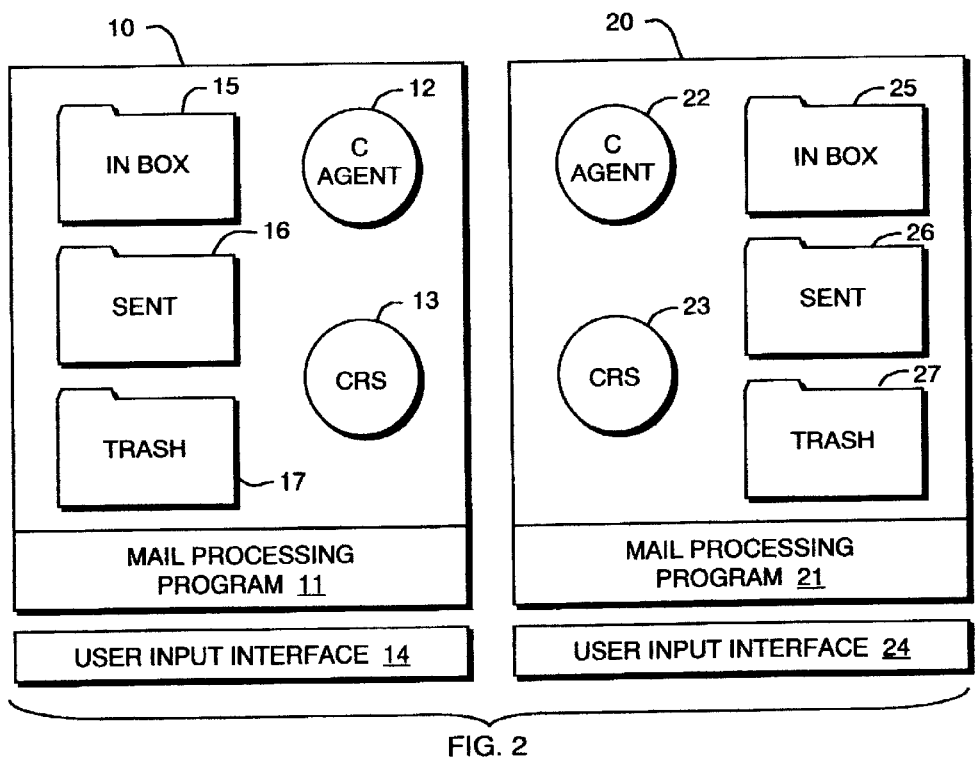
FIG. 2 illustrates a distributed computer environment in which the present invention can be implemented.

FIG. 2 shows a schematic of a distributed system in which the present invention can be implemented. The sending site 10 and all of the receiving sites 20 each have a mail processing program, 11 and 21 respectively, as in the prior art and at least one user input with interface, 14 and 24 respectively, for receiving user input. Provided for use by the mail processing program are a plurality of mail databases which include at least one inbox folder, 15 and 25 respectively, at least one sent folder, 16 and 26 respectively, and a trash folder, 17 and 27 respectively. Each inbox folder, shown at 15 and 25, is a queue for received mail which may or may not have been opened by the addressee. In some systems, there may be two separate folders, one for mail which has been delivered but not opened and one into which received mail is automatically transferred once it has been opened by the recipient. Whether the particular system has one or a plurality of inbox folders, the cancellation agent will be aware of all relevant locations in which it must search to locate a particular e-mail identified in a cancellation request.

Each sent folder, shown at 16 and 26, is a queue for copies of all pieces of e-mail which have been sent from that location by the user. Each trash folder, shown at 17 and 27, is a repository for all mail which the user has deleted from either the inbox or the sent folder. A user can "empty the trash", thereby deleting all records of a piece of mail from the trash folder, in which case the cancellation agent will be unable to locate that e-mail, as further discussed below.

Under the present invention, each location is additionally equipped with a cancellation agent, 12 and 22 at sites 10 and 20, respectively, and a cancellation request sender, 13 and 23 at sites 10 and 20, respectively. The cancellation agent and cancellation request sender are shown as two components for ease of description; but, clearly could be incorporated into a single component provided that all of the functionality described below is still included. The two functional components may also be incorporated into the mail processing program directly, or may be provided as "add-on" features which interact with existing mail processing programs.

The cancellation request sender, 13 at the sending location 10 of FIG. 2, comprises a component which has the functionality to automatically generate a cancellation request and transmit same to all destinations which received the previously-sent e-mail. The cancellation request sender is invoked by the user, via the user input and interface 14, for deleting a previously-sent e-mail. Upon receipt of user input, the cancellation request sender is provided with information regarding the previously-sent e-mail which is to be canceled. Optimally, the user invokes the cancellation request through the sent mail folder 16, so that the cancellation request agent can simply copy the relevant fields, including the e-mail identifier and the destination address fields. As an alternative, the user could select a "New Mail" option and then input a pre-designated term, for example "cancellation" or "deletion" or "interception" into the mail type designation field of the new mail, along with the e-mail identifier. Yet another alternative method would be to present the user with a new option, entitled "Cancellation" or a synonymous term, which could be selected from the menu of mail processing options. Upon selection of the Cancellation option, the user would be presented with a listing of e-mails in the sent folder from which they would select the e-mail to be canceled. Once the cancellation request sender has the e-mail identifier, it can automatically obtain the contents of the destination field in order to re-create the distribution list for the original e-mail.

Once the previously-sent e-mail has been designated for cancellation, the cancellation request sender then automatically copies at least the contents of the e-mail identifier and destination address fields of the previously-sent e-mail. By copying the destination address field, the cancellation request sender determines all destinations to which the previously-sent e-mail was transmitted and automatically assembles a cancellation request to be sent to each of those destinations. The cancellation request necessarily includes the pre-designated term (e.g., "cancel", "delete", or a synonym thereof) in its mail type designation field so that an agent on the receiving end will instantaneously recognize the type of e-mail and will invoke the cancellation procedure at the receiving site. Once the distribution list has been accessed, the cancellation request sender transmits the cancellation request, including the mail type designation and the e-mail identifier of the original, previously-sent e-mail, to all relevant destinations.

At the receiving end, a cancellation agent, 14 or 22 of FIG. 2, continuously checks the mail type designations in the mail type designation fields of all incoming pieces of e-mail. If the cancellation agent determines that a particular e-mail comprises a cancellation request, the cancellation agent takes steps to locate the piece of e-mail, by a search of the inbox and trash folders, which has the e-mail identifier shown in the cancellation request. Under a first implementation of the invention, upon location of the original e-mail, the cancellation agent will delete the e-mail and then report back to the cancellation request sender at the sending location. An alternative method is for the cancellation agent to first generate a status response to the sending location as soon as it has located the original e-mail. The status response would tell the cancellation request sender of the location at which the cancellation agent found the e-mail and of its read status. The cancellation request sender, with input from the user, could then either instruct cancellation of the e-mail or withdrawal of the cancellation request (e.g., when it is determined, by either location or read status of the original e-mail, that the e-mail has already been read, in which case it may be counterproductive to cancel same).

Figure 3:
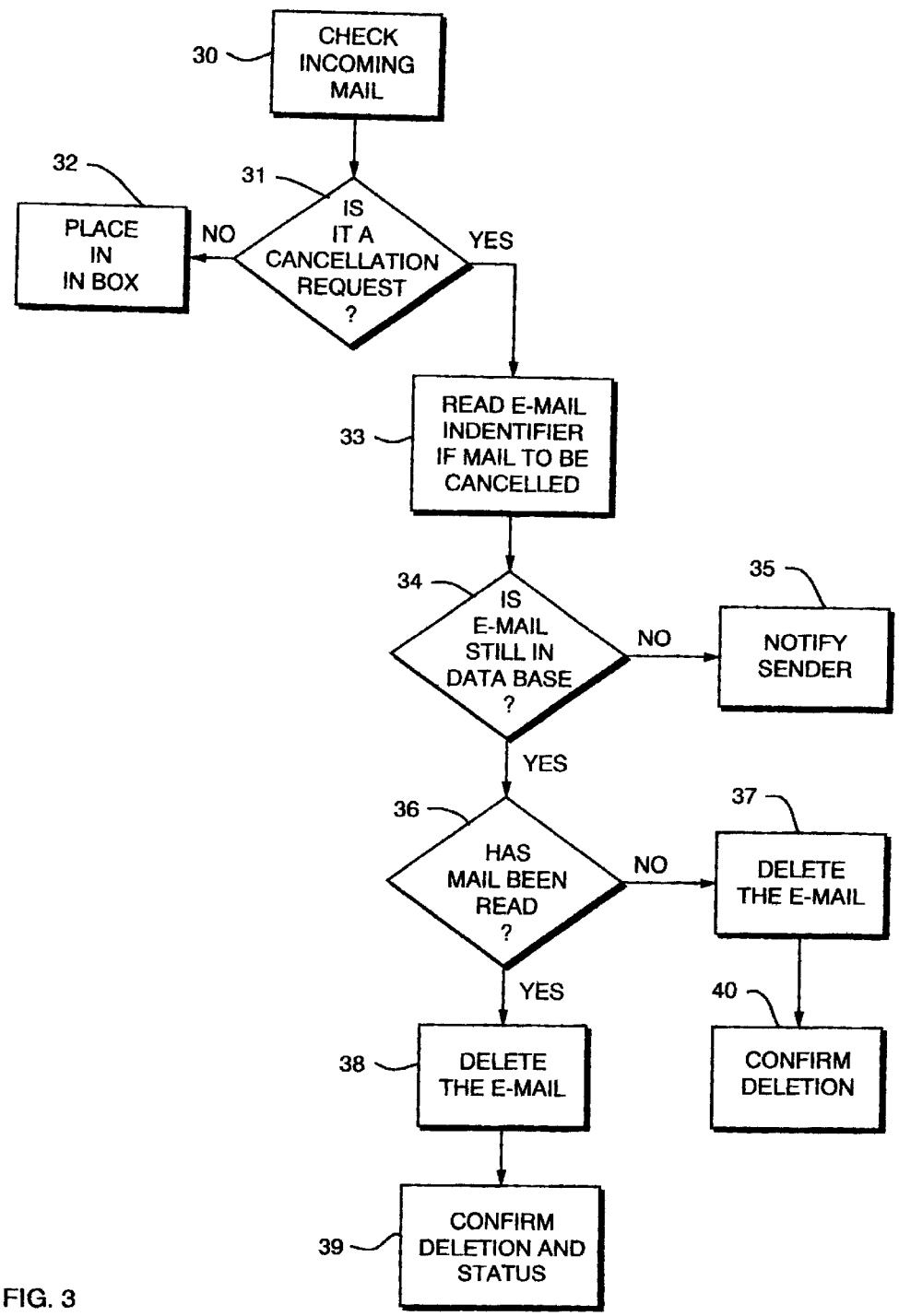
FIG. 3 provides a representative process flow for the present invention.

FIG. 3 depicts a representative process flow for execution by a cancellation agent. At step 30, the cancellation agent checks the incoming mail for the mail type designation. If it is determined at step 31 that the e-mail is not a cancellation request, then the mail is placed in the inbox folder at step 32. If, however, it is determined that the e-mail is a cancellation request, the cancellation agent reads the e-mail identifier of the e-mail which is to be canceled, at step 33. Once the cancellation agent has the e-mail identifier, the cancellation agent checks the relevant folders, at step 34, including the aforementioned inbox and trash folders or equivalents thereof, to determine if the e-mail is still in the database of the receiving site. If it is determined, at step 34, that the e-mail having the specified e-mail identifier is no longer in the database, then the cancellation agent notifies the sender, at step 35, that the e-mail to be deleted could not be located. As noted above, the e-mail could not be located if the receiver had downloaded the e-mail for reading or if the receiver had sent the e-mail to the trash folder and subsequently had emptied the trash folder.

If the e-mail is still in the database, a "yes" determination at step 34, the cancellation agent next determines, at step 36, if the e-mail having the specified e-mail identifier has been read. The cancellation agent can make the "read status determination" based on a number of different factors or settings, depending upon the specific mail program being used. For example, the location of the e-mail may be indicative of its read status, particularly in a system where opened mail is automatically transferred to a folder other than the inbox folder. Alternatively, the e-mail read status field may be consulted to determine if the mail has been opened. The state of the read status field, indicating the read status of an e-mail, may be changed once the e-mail has been opened. If such a read status indicator is available, the cancellation agent will use that indicator in executing step 36 to determine the read status of the e-mail. If the system does not use a read status indicator, the cancellation agent will simply default to the "not read" path, delete the e-mail and confirm deletion without reporting the read status to the user.

When the agent determines that the e-mail has not been read, the cancellation agent deletes the e-mail at step 36 and confirms the deletion at step 40 in a response sent to the user at the sending location. If, however, the e-mail has been read, as determined in step 36, the cancellation agent not only deletes the e-mail at step 38, but also reports the status of the e-mail in step 39 in the response to the user confirming deletion. As noted above, the order of processing may be altered to include a status reporting step (not shown) with response from the sending location prior to deleting the e-mail.

It is to be noted that the deletion of an e-mail by the cancellation agent comprises a complete removal of the e-mail, and not simply a redirecting of same into a trash folder. It is desirable to "leave no tracks" when deleting the e-mail, so that the intended recipient may never become aware of the fact that the original e-mail had been sent. It is also preferable that a user at the receiving location not be informed of the cancellation of an e-mail, although invocation of the cancellation agent may be recorded as a system function which can be discovered; and, the cancellation agent may be implemented as a switchable component of the mail processing program, such that a user can turn the cancellation agent off.

It is also envisioned that a plurality of e-mail messages could be designated for cancellation in a single cancellation request. One implementation of a multiple e-mail cancellation request would be when a user wishes to cancel all e-mail communications which were sent to a particular destination. Such may be desirable when a mail system has been breached and a particular location's mail folders are no longer considered secure. Yet another implementation of a multiple e-mail cancellation request may be a request for cancellation of all e-mails which have a specific mail type designation (i.e., subject). Upon receipt of such a user request, the cancellation request sender would need to search for all sent mail with the particular mail type designation, strip off the e-mail identifiers and destination information and assemble the cancellation request. Similar parsing would be required on the part of the cancellation agent at the receiving location in order to process a multiple e-mail cancellation request.

Another modification which may be desirable involves providing a "lingering" feature which may be useful for the rare instance in which the cancellation request arrives at the receiving location prior to arrival of the original e-mail message which is to be canceled. One implementation of the lingering feature would be to maintain the cancellation agent in an active state for a pre-set period of time after it has received a cancellation request. Setting a waiting period, during which the cancellation agent remains active and continues to scan the mail arriving at the inbox for the specified e-mail identifier, can insure that the specified piece of e-mail is intercepted prior to reading by the intended recipient. An alternative method for implementing a lingering feature would be to have the cancellation agent respond to the cancellation request agent to report that the mail had not been located, after which the cancellation request sender can either request that the cancellation agent remain active for a waiting period or can resend the cancellation request once or periodically thereafter.

Yet another extension of the present invention would be to provide a cancellation agent which is not tied exclusively to the mail program. Such an agent would be adapted to crawl through not only the mail files, but all files at a user location in order to locate the specified communication. Once a communication is stored at an alternative location which is not part of the mail processing system; however, it is likely that the communication would no longer by filed using its unique identifier and would, therefore, be more difficult to locate.

It will be apparent to one having skill in the relevant art that the invention may be adapted to different mail systems or to any distributed communications system in which communications having unique identifiers are buffered at a receiving location. For example, buffered audio-video content which is provided to a buffer for home viewing may be deleted prior to viewing. Such an implementation could be useful particularly for content which is rapidly updated, such as stock market quotations, election results, or other news communications which may be downloaded and buffered at a viewing location. While the invention has been described with reference to several preferred embodiments, without departing from the spirit and scope of the invention as set forth in the appended claims.

What is claimed is:

1. A system for an originating sender at a sending location to locate at least one unopened original sender communication originating at and transmitted from that sending location to one of a plurality of storage locations in at least one receiving location comprising:

a cancellation request sending component for receiving sender input and for automatically generating and transmitting a cancellation request to the at least one receiving location, said cancellation request comprising at least a unique identifier for the at least one unopened original sender communication generated at said sending location, said unique identifier having been assigned to the original sender communication by the originating sender when said sender generated said original sender communication, and the address of the at least one receiving location to which said sender sent said original sender communication; and a cancellation agent at the at least one receiving location adapted for receiving the cancellation request and for locating the at least one original sender communication.

2. The system of claim 1 wherein said cancellation agent is further adapted for deleting said at least one communication from the receiving location.

3. The system of claim 1 wherein the cancellation agent is additionally adapted to generate a response to the sender, said response including the status of the at least one communication.

4. The system of claim 2 wherein the cancellation agent is additionally adapted to generate a response to the sender, said response including the status and disposition of the at least one communication.

5. The system of claim 1 wherein said receiving location comprises a database having a plurality of folders and wherein said cancellation agent is adapted to search said plurality of folders for said at least one communication.

6. The system of claim 1 wherein said communication comprises electronic mail.

7. The system of claim 1 wherein the cancellation agent is additionally adapted to scan all incoming communications to identify any cancellation requests.

8. A cancellation request sending component for an electronic mail processing program comprising:

user input and interface means for receiving sender communication cancellation input for canceling an unopened original sender communication, said original sender communication having been generated by said sender;

a generating component for automatically generating a cancellation request in response to said sender communication cancellation input without opening said original sender communication, said cancellation request comprising at least a unique identifier for at least one original sender communication, said unique identifier having been assigned to the original sender communication by the originating sender when said sender generated said original sender communication, and the address of at least one receiving location to which said sender sent said original sender communication; and transmission means for transmitting the cancellation request to the at least one receiving location.

9. The cancellation request sender of claim 8 wherein said generating component comprises means to automatically assemble said cancellation request based on a previously-sent communication.

10. A cancellation agent for locating original sender communications received at a receiving location comprising:

a receipt component for receiving a cancellation request from a sending location, said cancellation request specifying at least one original sender communication to be located; and a browsing component for locating the at least one communication to be located.

11. The cancellation agent of claim 10 further comprising a component for deleting the at least one communication once located.

12. The cancellation agent of claim 11 further comprising a response component for generating a response to the sender, said response including the status and disposition of the at least one communication.

13. The cancellation agent of claim 10 further comprising a response component for generating a response to the sender, said response including the status of the at least one communication.

14. The cancellation agent of claim 10 wherein the receipt component comprises an identifier component for identifying cancellation requests among incoming communications.

15. The cancellation agent of claim 14 wherein the identifying component comprises a scanning component for scanning the communication type designation for each incoming communication.

16. A method for a sender at a sending location to locate at least one original sender communication originating at and transmitted from that sending location to one of a plurality of locations in at least one receiving location comprising:

generating a cancellation request comprising at least a unique identifier for the at least one original sender communication, said unique identifier having been assigned to the original sender communication by the originating sender when said sender generated said original sender communication, and a communication type designator for the at least one original sender communication which was generated by said sender at said sending location without opening said original sender communication;

transmitting the cancellation request to the receiving location;

receiving the cancellation request at the receiving location; and ascertaining if the at least one original sender communication is located at the receiving location by using said unique identifier.

17. The method of claim 16 further comprising the step of deleting the at least one communication from the receiving location if located.

18. The method of claim 16 further comprising the step of notifying the sender of the status of the at least one communication.

19. The method of claim 17 further comprising the step of notifying the sender of the status and disposition of the at least one communication.

20. The method of claim 18 wherein said notifying the sender of the status comprises notifying the sender when said at least one communication cannot be located at the receiving location.

21. The method of claim 16 wherein said generating the cancellation request comprises assembling a request comprising a plurality of unique identifiers for a plurality of communications and one communication type designator.

22. An electronic mail system comprising:

a mail processing program;

at least one sender input and interface for receiving sender input to said electronic mail system;

a cancellation request sending component at a sending location comprising a generating component for automatically generating a cancellation request in response to sender cancellation input without opening said original sender communication, said cancellation request comprising at least a unique identifier for at least one piece of electronic mail originating at said sending location, said unique identifier having been assigned to the original sender communication by the originating sender when said sender generated said original sender communication, and the address of at least one receiving location to which said sender sent said original sender communication; and transmission means for transmitting said cancellation request to the at least one receiving location; and a cancellation agent for locating communications received at a receiving location comprising a receipt component for receiving the cancellation request from the cancellation request sending component and a browsing component for locating the at least one piece of electronic mail to be located.

23. The electronic mail system of claim 22 wherein said cancellation agent further comprises a component for deleting the at least one piece of electronic mail once located.

24. The electronic mail system of claim 22 wherein said cancellation agent further comprises a response component for generating a response to the sender, said response including the status of the at least one piece of electronic mail.

25. The electronic mail system of claim 22 wherein said cancellation agent further comprises a response component for generating a response to the sender, said response including the status and disposition of the at least one piece of electronic mail.

26. A program storage device readable by machine, tangibly embodying a program of instructions executable by the machine to perform the steps of locating at least one original sender communication originating at and transmitted from a sending location to one of a plurality of locations in at least one receiving location comprising:

generating a cancellation request at said sending location from which the at least one original sender communication originated comprising at least a unique identifier for the at least one communication, said unique identifier having been assigned to the original sender communication by the originating sender when said sender generated said original sender communication, and a communication type designator for the at least one original sender communication which was generated by said sender without opening said original sender communication;

transmitting the cancellation request to the receiving location; and receiving location input from the receiving location.

27. A program storage device readable by machine, tangibly embodying a program of instructions executable by the machine to perform the steps of locating at least one original sender communication transmitted from a sending location to one of a plurality of locations in at least one receiving location comprising:

receiving a cancellation request generated by the sender of said original sender communication at said sending location without opening said original sender communication, said cancellation request designating the at least one original sender communication by unique identifier, said unique identifier having been assigned to the original sender communication by the originating sender when said sender generated said original sender communication; and ascertaining if the at least one original sender communication is located at the receiving location by using the unique identifier.

28. A program storage device readable by machine, tangibly embodying a program of instructions executable by the machine to perform the steps of deleting at least one original sender communication originating at and transmitted from a sending location to one of a plurality of locations in at least one receiving location comprising:

generating a cancellation request at said sending location, said cancellation request comprising at least a unique identifier for the at least one original sender communication, said unique identifier having been assigned to the original sender communication by the originating sender when said sender generated said original sender communication, and a communication type designator for the at least one original sender communication which was generated by said sender without opening said original sender communication;

transmitting the cancellation request to the receiving location;

receiving a cancellation request designating at least one original sender communication by unique identifier;

locating the at least one original sender communication is located at the receiving location by using the unique identifier;

deleting the at least one original sender communication; and notifying the sending location of the status and disposition of the at least one original sender communication.

* * * * *